July 4, 1950     E. W. STRONG     2,513,688
TOY AIRCRAFT
Filed Feb. 26, 1948     2 Sheets-Sheet 1
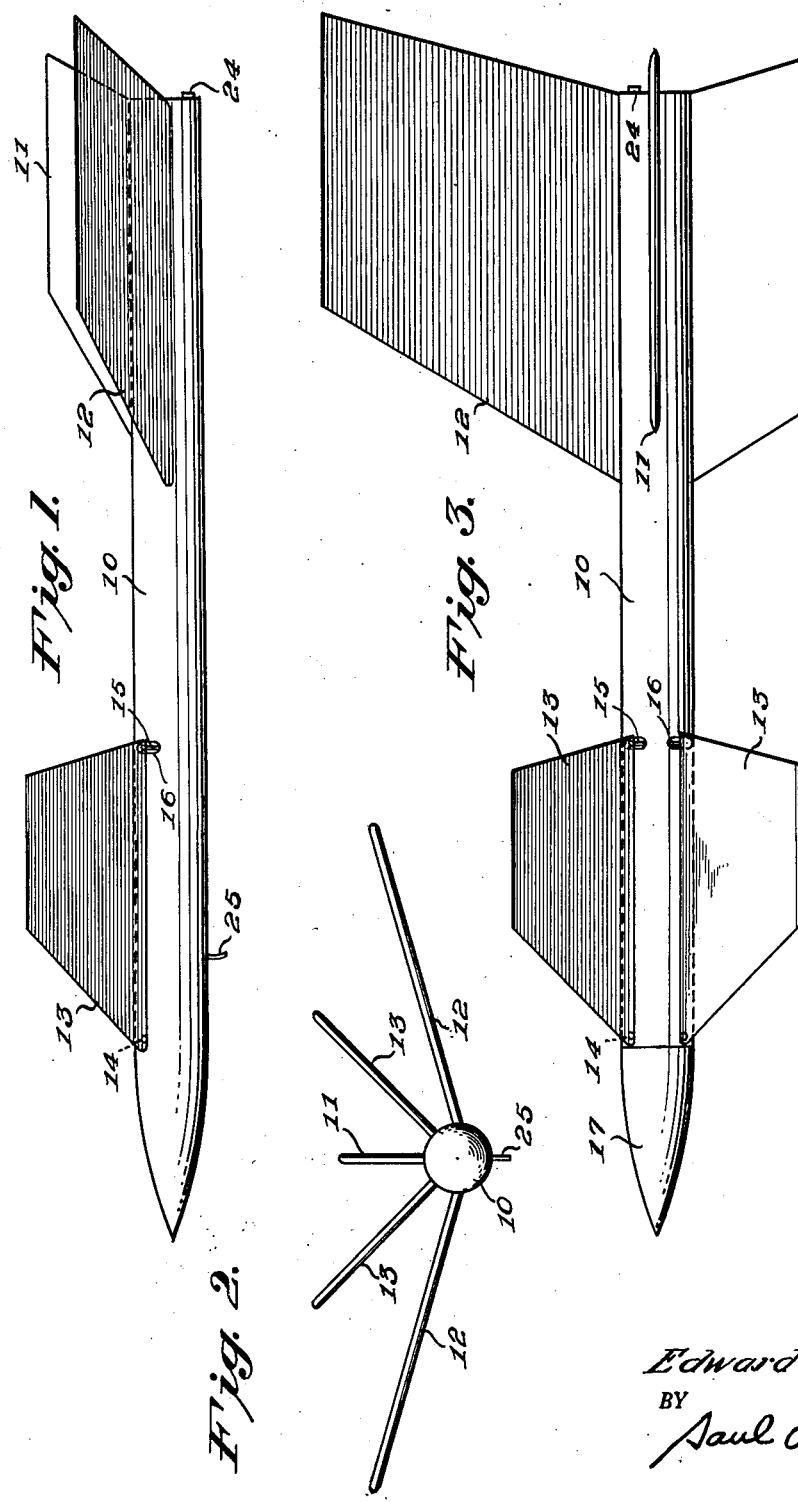
INVENTOR.
Edward W. Strong
BY
Saul E. Spector July 4, 1950 E. W. STRONG 2,513,688
TOY AIRCRAFT
Filed Feb. 26, 1948 2 Sheets-Sheet 2
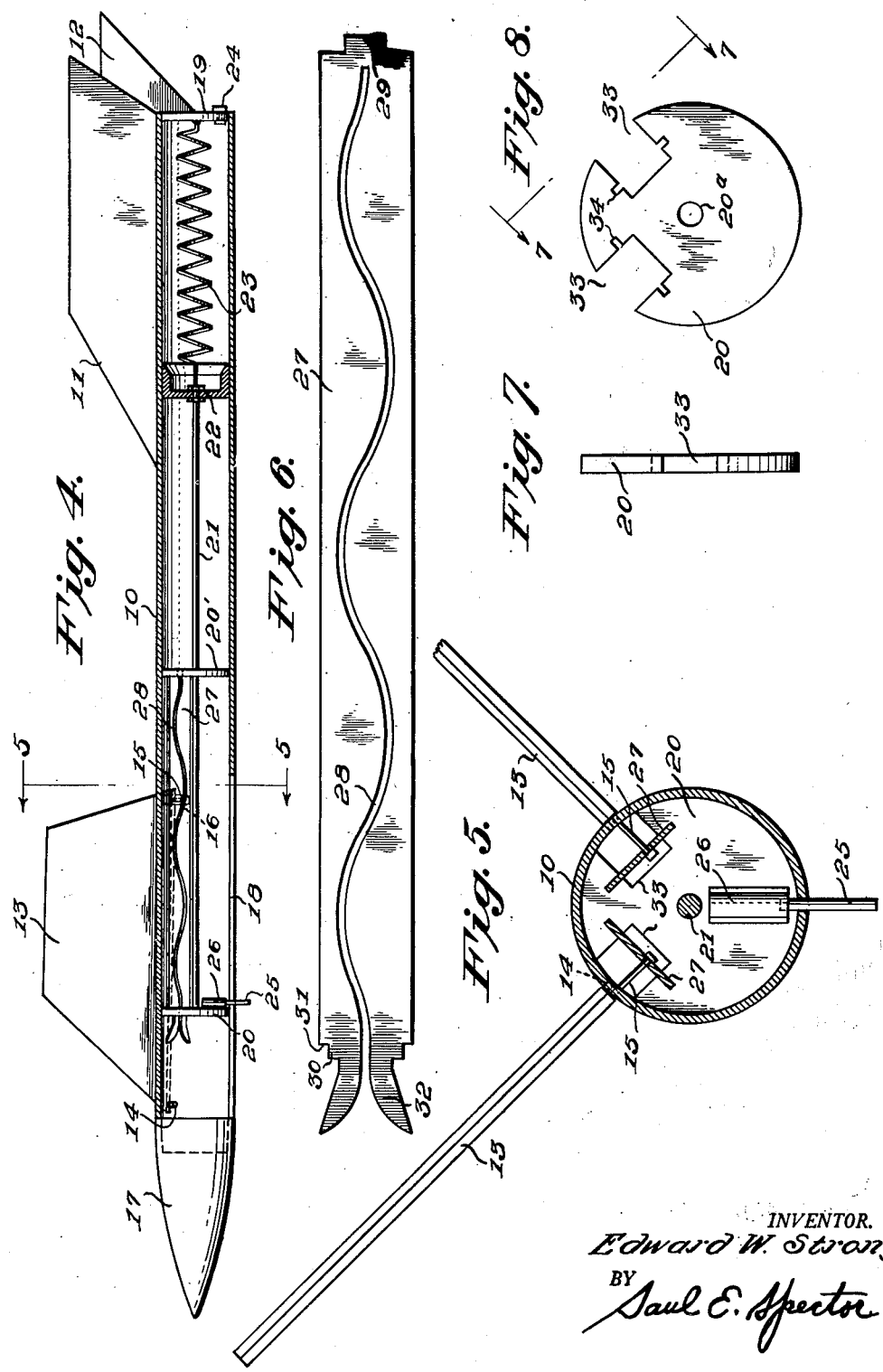
INVENTOR.
Edward W. Strong
BY
Saul E. Spector Patented July 4, 1950

2,513,688

UNITED STATES PATENT OFFICE 2,513,688

TOY AIRCRAFT

Edward W. Strong, South Gate, Calif.

Application February 26, 1948, Serial No. 11,019

6 Claims. (Cl. 46—76)

This invention relates to toy or model aircraft and the like.

A primary object of the invention is the construction of a toy aircraft adapted for manual takeoff although not limited thereto and having incorporated therein control means for directing same in a predetermined course of travel in the air.

Yet a further object is the provision of a toy or model aircraft preferably adapted for manual projection into the air and having incorporated therein flight control means arranged for operation upon projection of the aircraft, with said control means adjustable in its speed of action whereby the time interval of change in direction of the aircraft may be readily varied.

A still further aim of the invention is the making of a toy aircraft which is relatively simple in construction, durable and reliable in use and which embodies novel mechanical control means constituting a highly attractive device in operation.

Other objects and advantages of the invention will be readily apparent in the course of the following detailed description, when taken in conjunction with the accompanying drawings in which like numerals represent like parts and wherein:

Fig. 1 is a side elevational view of a toy aircraft constructed in accordance with a preferred embodiment of the invention.

Fig. 2 is a front view of the aircraft shown in Fig. 1.

Fig. 3 is a top plan view of the aircraft.

Fig. 4 is a slightly enlarged longitudinal vertical sectional view disclosing in detail the means for imparting movement to the movable wings of the aircraft.

Fig. 5 is a substantially enlarged transverse sectional view taken on line 5—5 of Fig. 4.

Fig. 6 is a side view of one of the cam plates, the view being on the same scale as Fig. 5.

Fig. 7 is an edge view of one of the cam plate supporting disks as observed in the plane of line 7—7 in Fig. 8; and Fig. 8 is a front view of the disk shown in Fig. 7.

Referring now in detail to the drawings by numerals, 10 designates the body or fuselage of the novel toy aircraft and which, as shown, is preferably of substantially cylindrical form, but is not limited to such form, as the body may be of different cross section without in any way affecting the character of the instant invention.

The fuselage or body 10 is preferably of substantial length and is provided at its rear end and on the upper surface thereof with a vertically disposed stabilizing fin 11 and opposed fixed wings 12 which incline upwardly at a small angle relative to a horizontal plane passing through the axis of the body 10. The latter adjacent its front end has a pair of movable wings 13 which, as seen in Fig. 2, are also upwardly inclined relative to said horizontal axial plane; said wings being preferably normally disposed at an angle of 45° to the aforementioned plane as well as to said stabilizer 11 which lies in a vertical axial plane of the body. The wings 13 are each pivotally connected adjacent their forward ends to the wall of body 10 as indicated at 14, and adjacent their rear ends said wings are each provided with a follower pin 15 which projects through a slot 16 in the wall of body 10.

Pins 15 are actuated by means later referred to and the pivot 14 provides for movement of the wings upon the pins 15 being moved such that the wings retain their angular disposition relative to said horizontal axial plane but are movable relative to planes including the axis of the body and the pivot 14. Body 10 is tubular throughout its entire length except for the front end which is pointed for facilitating projection and said pointed end may be solid as shown. Additionally the body has a slot 18 adjacent its forward end and, as seen in Fig. 4, this slot is of substantial length and is disposed in the bottom wall portion in the vertical axial plane of the body. A disk 19 is removably secured in the rear end of body 10 by any suitable means and has an air-tight fit therein.

A pair of disks 20, 20' are rigidly supported in predetermined spaced relation on a rod 21 which extends within the cylindrical body 10 axially thereof. Said rod extends through apertures 20a in the respective disks and is rigidly secured therein by any suitable means. A cup-shaped gasket or plunger 22 is fixed to the rear end of rod 21 and is located between the disks 19 and 20'. A coil spring 23 is located between the gasket 22 and the disk 19; the forward end of the spring being secured to the rear end of rod 21 and the rear end of said spring fastened to disk 19. The latter is provided with an adjustable air valve 24 for a purpose which will appear later.

The reference numeral 25 designates a lug which normally projects through and is movable in the slot 18 and said lug is vertically slidably disposed in a bracket 26 secured to the rear face of disk 20. A pair of cam plates 27 are supported by the disk 20 and 20', each of said cam plates being formed with a slot providing a cam track 28 in which the aforementioned pins 15 ride in a manner to be described in more detail hereinafter. Said cam plates are removably seated on the disks 20, 20', but are rigidly held thereby and to attain this object said plates and disks are constructed as follows.

Each cam plate has a rear extension 29 removably seated in a conforming slot in disk 20' as can be seen in Fig. 4 and the forward end of each cam plate includes a pair of lugs 30 and adjacent shoulders 31 together with diverging forward extensions 32 constituting a wide converging entrance to cam track 28. Disk 20 has a pair of rectangular openings 33 and a pair of slots 34 extend into the disk from the opposed side walls defining each of the openings 33. In assembled position the extensions 32 extend through the openings 33, the lugs 30 seat in the slots 34 and the shoulders 31 engage a face of the disk 20 adjacent the slots 34. Thus the cam plates are rigidly held in position and by the provision of the openings 33 together with the fact that the relatively long thin cam plates are capable of flexing, the forward ends of the cam plates can readily be connected with the disk 20 after entrance of an extension 29 in a corresponding slot in disk 20'.

The movement of wings 13 is effected by pins 15 riding in cam slots 28 and the character of the movement of said wings will, of course, be determined by the form or outline of the cam tracks and it is for this reason that the cam plates are removably supported by the disks 20, 20' whereby cam plates having various forms of cam tracks may be selectively employed. In the assembly of the device, a pair of cam plates 27 are assembled with disks 20, 20' outside of the cylindrical body 10 after which the lug 25 is pushed up into the bracket 26 and the assembly including disks 20, 20', plates 27, rod 21, gasket 22, and spring 23 are pushed forwardly into the body 10 with closing disk 19 trailing the spring. Disk 19 is then fastened in the rear end of the body by any conventional means. In the assembly as above described the converging mouths defined by extensions 32 engage and direct the pins 15 into the cam track slots 28.

Spring 23, as shown, is a tension spring and urges the rod 21 together with the disks 20, 21' and gasket 22 toward the rear of the body and the disk 20 is normally slightly in advance of the pins 15, and at this point it is to be noted that the openings 33 in disk 20 provide passages for the pins during the assembly of the device.

In operation, the aircraft which in its disclosed form is that of a rocket, is launched by looping a rubber band or other extensible and contractible member over the lug 25 while holding the rear end of the body in one hand and with the other hand pulling forwardly on the band until lug 25 engages the forward end of slot 18 and in which position the pins 15 will be disposed in the rear ends of the cam slots. The band may be further tensioned and upon release of the rear end of the body, the device will be projected into the air at a chosen angle. After having drawn the assembly forward as described, the spring 23 will be substantially tensioned as a result of which it will tend to move the assembly including cam plates 27 rearwardly and if the rear end of the body were wholly open to the atmosphere, the assembly would move rearwardly quite rapidly. However, by the provision of valve 24 such movement is retarded since gasket 22 can move rearwardly only as air is discharged from the chamber between same and the sealing disk 19. As previously mentioned, valve 24 is adjustable, that is to say, the area of the opening in said valve may be changed so that the rate of movement of the cam plates rearwardly can be varied within relatively wide limits.

It will now be understood that rearward movement of the cam plates causes the pins 15 to be moved laterally of planes disposed at 45° angles to the horizontal axial plane of the body, with the result that the rear ends of wings 13 will be alternately raised and lowered within a corresponding downward and upward movement of the aircraft during the flight thereof. The cam tracks have been shown as being substantially symmetrical to a longitudinal center line of the plates but they may be variously formed and one-track may be of a radically different character than the other, whereby, for example, sidewise movements will be imparted to the aircraft.

As heretofore stated, the invention is not limited to the form of body shown and described nor to the specific form and disposition of fixed and movable wings 12 and 13, respectively, carried thereby. The wings 13 may be disposed at angles other than that disclosed and may in fact be horizontally positioned. Also the aircraft may be projected, if desired, by a miniature motor or other motive power.

While the invention has been described in detail, it will be apparent that various changes may be made in the exact construction shown as will be apparent to those skilled in the art, and it is contemplated to cover all such variations and to be limited in this respect only as may be necessary by the scope of the claims hereto appended.

What I claim and desire to secure by Letters Patent is:

1. In a toy aircraft, an elongated hollow body, wings movably supported by the body, elongated cam plates movable longitudinally of the body, each plate having a cam track cooperating with a wing for movement of the latter, spring means within the body having one end secured to said plates and its opposite end to a stationary part of the body, and a plunger and valve in the body for controlling the speed of movement of said plates by said spring upon tensioning of the latter.

2. In a toy aircraft, an elongated hollow body having slots in the wall thereof at each side of an axial vertical plane, a pair of wings, each pivotally connected adjacent one end to said wall and each having a follower pin extending through one of said slots, an elongated cam plate having a cam track engaged by each of said follower pins, means supporting said cam plates for movement longitudinally within said body, a tension spring within said body normally urging said plates rearwardly of the body and a lug connected to said supporting means engageable by an extensible and contractible launching member, in the action of which the cam plates are moved forwardly of the body against the action of said spring.

3. The structure of claim 2, and wherein said cam plates are removably supported by a pair of spaced disks having a rod extending axially therethrough and rigidly connected therewith, a gasket having an air-tight engagement with the inner wall of the body and rigidly connected with the rod adjacent the rear end of the body, an air-tight closure disk removably supported in the rear end of the body and having an adjustable air valve, said spring being disposed between and connected to said gasket and said closure disk.

4. In a toy aircraft, an elongated hollow body, wings movably supported by the body, cam plates movable longitudinally of the body and each having a cam track cooperating with a wing, said plates being manually movable forwardly of the body, spring means urging the plates rearwardly of the body, and adjustable valve means in the body for controlling the speed of movement of said plates.

5. In a toy aircraft, an elongated hollow body, wings movably supported by the body, elongated cam plates movable longitudinally of the body, each plate having a cam track cooperating with a wing for movement of the latter, spring means within the body, a plunger and adjustable valve means in the body, said plunger being secured to said plates and said spring means having one end secured to said plunger and its opposite end to a stationary part of the body, said spring urging the plates rearwardly and said valve controlling the speed of movement of said plates.

6. In a toy aircraft, a hollow body, wings movably supported by the body, cam plates within the body movable longitudinally thereof, each plate having a cam track cooperating with a wing to move same, means for moving the plates in one direction, resilient means connected to said plates urging the plates in the opposite direction, and valve means for controlling the speed of movement of said plates.

EDWARD W. STRONG.

REFERENCES CITED

The following references are of record in the file of this patent:

UNITED STATES PATENTS

| Number | Name | Date |
|---|---|---|
| 1,388,620 | Turner | Aug. 23, 1921 |
| 1,583,155 | Jacobs | May 4, 1926 |
| 2,098,019 | Weimerskirch | Nov. 2, 1937 |
| 2,277,882 | Quady | Mar. 31, 1942 |